US009137327B2

(12) United States Patent
Dudziak et al.

(10) Patent No.: US 9,137,327 B2
(45) Date of Patent: Sep. 15, 2015

(54) DYNAMIC CONSENT ENGINE

(71) Applicant: Verizon Patent and Licensing Inc., Arlington, VA (US)

(72) Inventors: Thaddeus J. Dudziak, Pleasanton, CA (US); Paul T. Schultz, Colorado Springs, CO (US); Robert A. Sartini, Colorado Springs, CO (US); Peter D. Grubb, Glen Rock, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 217 days.

(21) Appl. No.: 13/899,269

(22) Filed: May 21, 2013

(65) Prior Publication Data

US 2014/0351368 A1    Nov. 27, 2014

(51) Int. Cl.
*H04L 29/08*    (2006.01)
(52) U.S. Cl.
CPC ........................................ *H04L 67/32* (2013.01)
(58) Field of Classification Search
CPC ...................................................... H04L 67/32
USPC ............ 709/217, 223, 224; 705/14.64, 14.73, 705/44
See application file for complete search history.

(56) References Cited

U.S. PATENT DOCUMENTS

| 7,610,391 | B2* | 10/2009 | Dunn | 709/229 |
|---|---|---|---|---|
| 2009/0158393 | A1* | 6/2009 | Monjas Llorente et al. | 726/3 |
| 2012/0227097 | A1* | 9/2012 | Nakhjiri | 726/7 |
| 2013/0110949 | A1* | 5/2013 | Maurel et al. | 709/206 |

OTHER PUBLICATIONS

"Security Challenges for Internet Technologies on Mobile Devices"—Microsoft, May 2008 http://www.w3.org/2008/security-ws/papers/microsoft-position-paper.pdf.*

* cited by examiner

*Primary Examiner* — Randy Scott

(57) ABSTRACT

A system may be configured to request, from a user device, consent for an application server to output one or more messages to the user device. When requesting the consent, the system may output a consent message associated with the application server. The system may receive, from the user device, an indication of consent, the indication being sent by the user device based on the consent message; and enforce, by the consent gateway device, the consent indicated by the user device. When enforcing the consent, the system may allow or disallow application traffic, from the application server, based on the indication of consent. The application traffic may be associated with the user device.

20 Claims, 12 Drawing Sheets

| Application ID | Custom consent message | Consent options/actions |
|---|---|---|
| 7777 | Please confirm you signed up for Yellow Cab service. Reply Y to allow a one-time location request, or reply N to reject | <ul><li>Y: one-time location request</li><li>N: deny</li><li>All others: re-send consent message once</li><li>No answer for 15 minutes: deny</li></ul> |
| 8888 | Thanks for signing up for Location tracker! Reply A to always allow access, or reply with a number specifying how many hours to allow access. Reply 0 or N to deny access. | <ul><li><non-zero integer>: allow for <non-zero integer> hours</li><li>A: always allow</li><li>All others: deny</li><li>No answer for 10 minutes: re-send consent message once</li><li>No answer for 20 minutes: deny</li></ul> |
| 9999 | <Default consent message> | <ul><li><Default options/actions></li></ul> |

FIG. 5

DYNAMIC CONSENT ENGINE

BACKGROUND

Users of user devices, such as cellular telephones and tablets, often choose to use services, such as services that send messages to the user devices, provide location-based information and services, access, receive and/or collect data from the user devices, etc. These services may obtain consent from a user by, for example, sending a message (e.g., a short message service ("SMS") message) to the user device, and receiving a message back from the user (e.g., an "Allow" message or a "Deny" message).

In some situations, a user's service provider or network provider (e.g., a wireless provider that provides wireless service to the user device) may not be involved in the consent process. Thus, situations may occur where a service or application may access, collect, or receive user device information even without a user's consent (either intentionally or unintentionally), which may result in additional service charges to the user, loss of the user's privacy, or other harm.

BRIEF DESCRIPTION OF THE DRAWINGS

FIG. 5 illustrates an example data structure that may be stored by a consent gateway, according to one or more implementations;

DETAILED DESCRIPTION OF PREFERRED EMBODIMENTS

The following detailed description refers to the accompanying drawings. The same reference numbers in different drawings may identify the same or similar elements.

Techniques described herein may allow for applications to obtain consent (e.g., consent to send messages, provide location-based information and services, access, receive, and/or collect information, etc.) from users using customized consent parameters. These customized consent parameters may include, for example, custom consent messages that are provided by the applications, custom options relating to user replies to the consent messages, and/or custom actions to take based on the replies.

Figure 1:
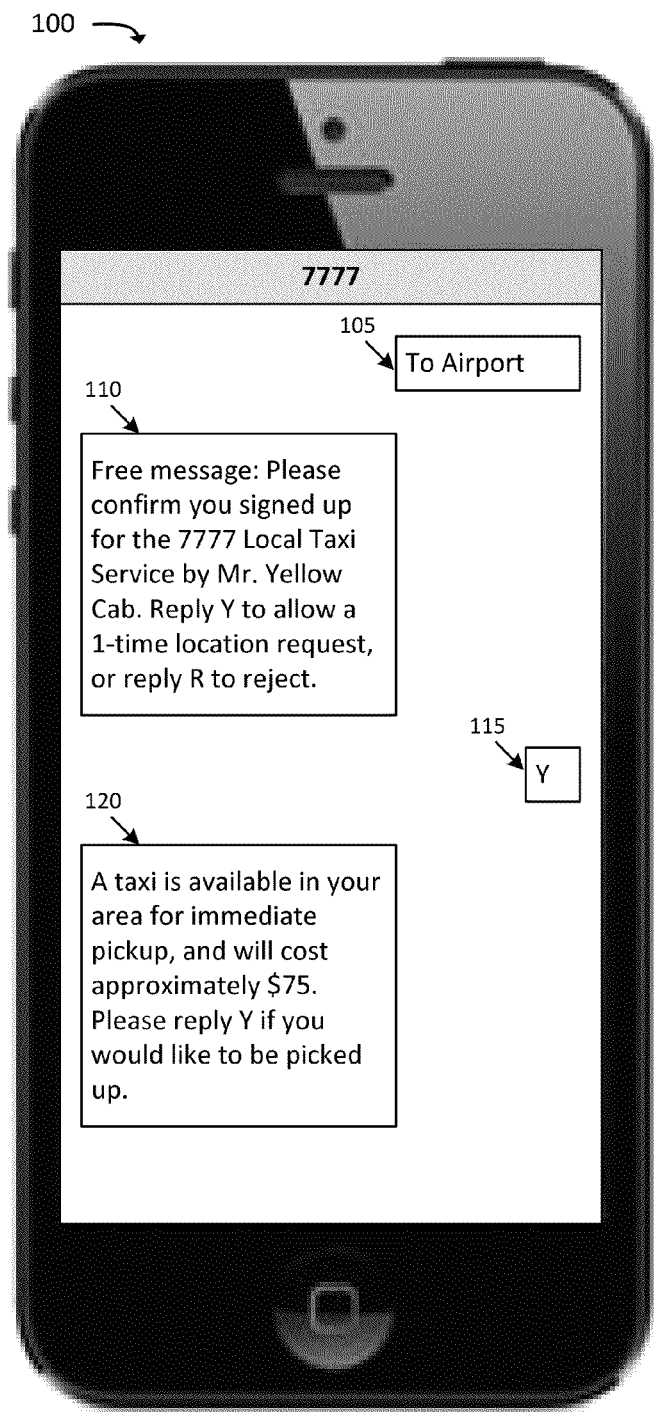
FIG. 1 illustrates an overview of one or more example implementations described herein.

FIG. 1 illustrates an overview of one or more example implementations described herein. As shown in FIG. 1, user device 100 (such as a wireless telephone or a tablet) may send and receive messages (such as text messages 105-120). In the example shown in FIG. 1, user device 100 may send messages 105 and 115 to an application server, by sending messages 105 and 115 to a directory number (e.g., the "short code" 7777, as shown in this example) associated with an application executing on an application server. Messages 110 and 120 may be sent from the application server and/or from a consent gateway, as described in more detail below.

Message 105, sent by user device 100, may be a message associated with a service provided by the application server, or may be a request to enroll in the service. For instance, assume that the service provided by the application server is a taxi service, where a user can request a taxi from the user's present location to a desired destination. The application server may obtain information regarding the user's present location from user device 100 and/or from another source (e.g., from a cellular network associated with the user device) in order to identify taxis near the user's location, and/or to calculate service information, such as distance, travel times, and/or other types of information.

As further shown in FIG. 1, user device 100 may receive message 110, which may be a confirmation or request for consent from the user ("Free message: Please confirm you signed up for the 7777 Local Taxi Service by Mr. Yellow Cab. Reply Y to allow a 1-time location request, or reply R to reject"). Message 110 may be a custom consent request message provided by the application server. For instance, different application servers or services may provide different consent request messages than the one shown in FIG. 1, or a service provider or a network provider may define a default consent message for use by application servers that operate on the provider's platform.

After receiving message 110, user device 100 may send message 115 ("Y"), which may indicate consent, from a user of user device 100, for a one-time location request to be performed on behalf of the user by the application server. The application server may, based on receiving the consent indicated by message 115, perform the location request, and may determine that a taxi is available near the user's location. User device 100 may receive message 120 from the application server ("A taxi is available in your area for immediate pickup, and will cost approximately $75. Please reply Y if you would like to be picked up").

By providing for custom consent messages and options, some implementations may provide for an enhanced user experience. For example, consent messages may provide more relevant options than default consent messages, and may result in fewer messages being sent to or from user devices. Custom consent messages may also afford the ability to provide clear disclosure to users. Additionally, custom consent messages afford the ability to provide an improved user experience by only requesting minimal information from the user only when required. Additionally, custom consent messages may provide the opportunity to add advertising and/or branding, which may provide for enhanced revenue generation or monetization. Furthermore, as described herein, a service provider- or a network provider-controlled consent system may ensure that application servers do not maliciously or accidentally access, collect, or receive user information, or send messages to user devices, without user consent.

Figure 2A:
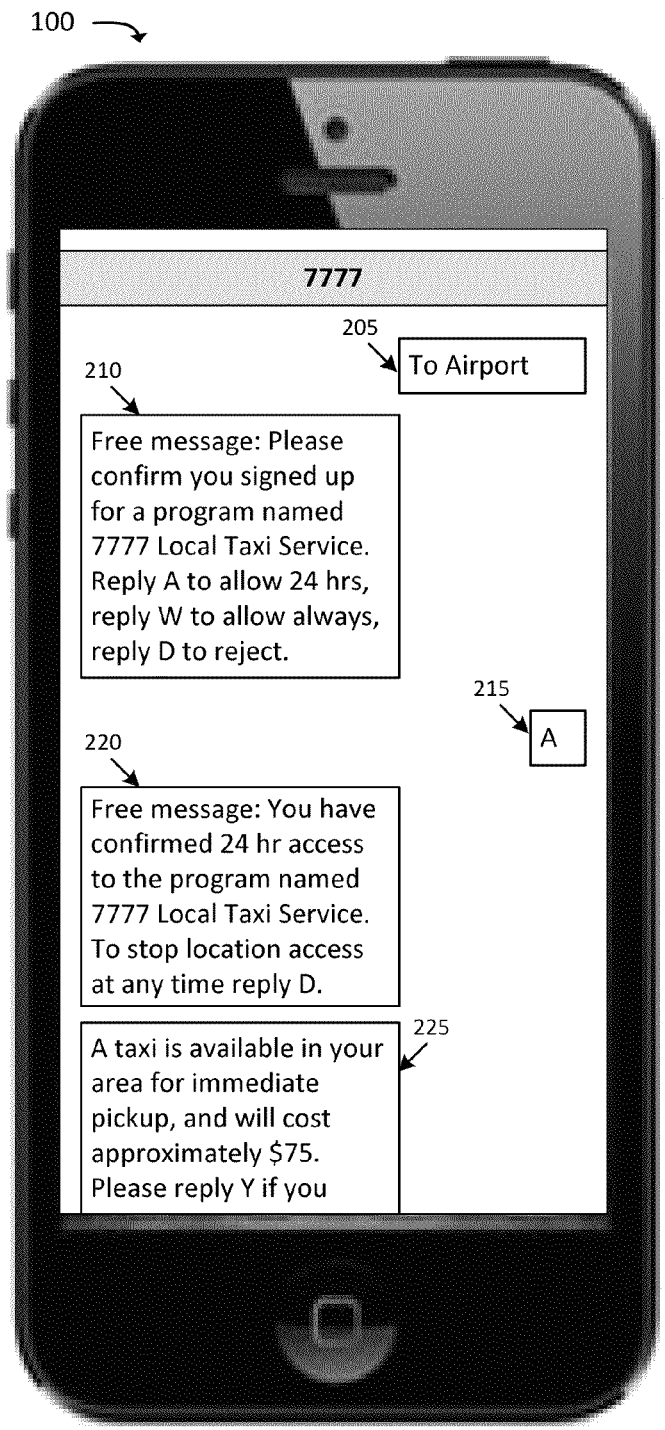
FIGS. 2A and 2B illustrate potential shortcomings of not providing for custom consent messages.
Figure 2B:
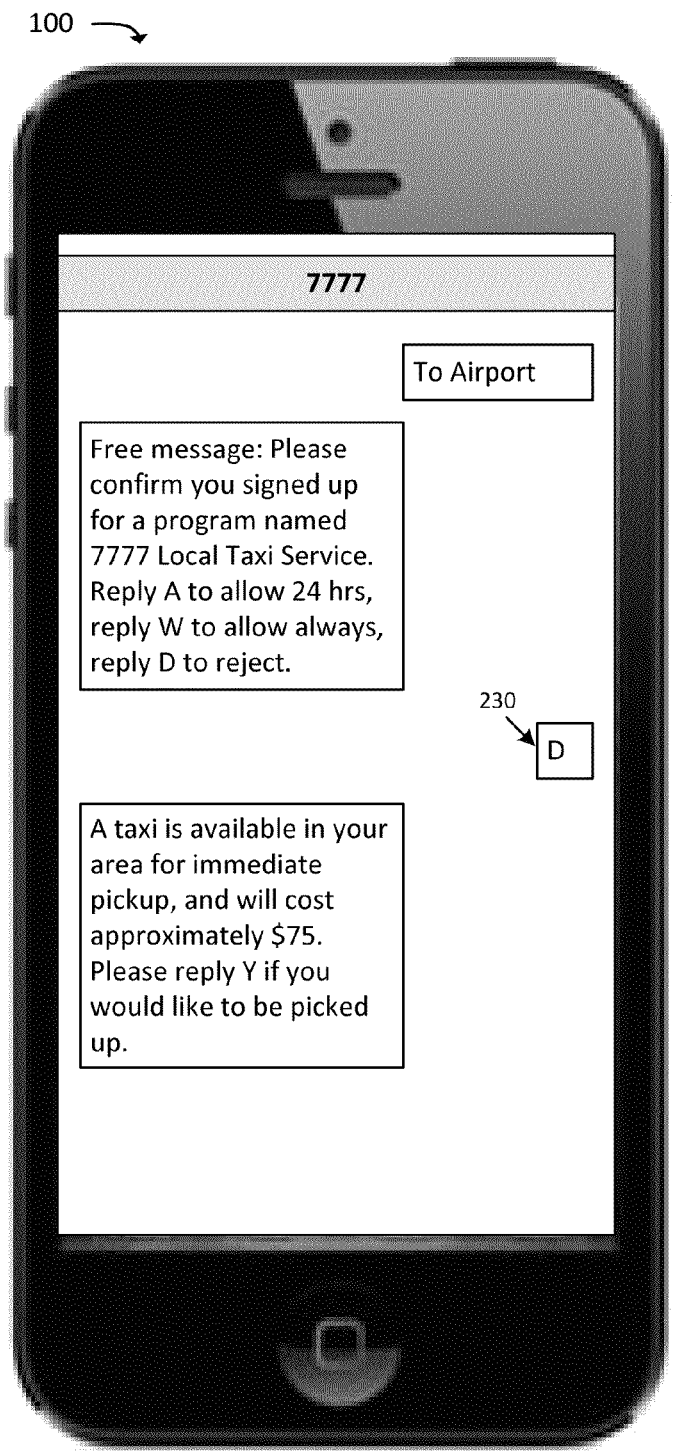

FIGS. 2A and 2B illustrate potential shortcomings of not providing for custom consent messages (e.g., without using one or more techniques described herein). As shown in FIG. 2A, user device 100 may send and receive messages (such as text messages 205-225). In the example shown in FIG. 2A, user device 100 may send messages 205 and 215 to an application server, by sending messages 205 and 215 to a directory number (e.g., the short code 7777, as shown in this example) associated with an application executing on an application server. Messages 210, 220, and 225 may be sent from the application server and/or another device on behalf of the application server.

Message 205, sent by user device 100, may be a message associated with a service provided by the application server, or may be a request to enroll in the service. For instance, assume that the service provided by the application server is a taxi service, where a user can request a taxi from the user's present location to a desired destination. The application server may obtain information regarding the user's present location from user device 100 and/or from another source (e.g., from a cellular network associated with the user device) in order to identify taxis near the user's location.

As further shown in FIG. 2A, user device 100 may receive message 210, which may be a confirmation or request for consent from the user ("Free message: Please confirm you signed up for a program named 7777 Local Taxi Service. Reply A to allow 24 hrs, reply W to allow always, reply D to reject."). Message 210 may be a default consent request message provided by a network provider associated with user device 100. The options provided in this default consent message may not be particularly relevant to the service being provided (e.g., it may not be useful or desirable to allow 24-hour access to a service when a user merely wishes to find a taxi). In contrast, in the example shown in FIG. 1, custom consent message 110 may provide more relevant options than default consent message 210.

After receiving message 210, user device 100 may send message 115 ("A"), which may indicate consent, from a user of user device 100, for 24-hour access for location requests to be performed on behalf of the application server. User device 100 may receive message 220 ("Free message: You have confirmed 24 hr access to the program named 7777 Local Taxi Service. To stop location access at any time reply D"). Message 220 may indicate that the user's consent has been received. After receiving message 220, user device 100 may further receive message 225, which may be provided by the application server based on the application server performing a request for the user's location.

FIG. 2B illustrates a similar message exchange as illustrated in FIG. 2A, except that the user has replied with message 230 ("D"), which indicates the user's rejection of the service offered by the application server. However, as shown in FIG. 2B, the application server may continue to send messages to user device 100, even without the user's consent. Such a situation may occur when a network provider does not exercise control over consent messages sent to the users of the service provider. A service may thus maliciously or accidentally send such messages without users' consent, or may maliciously or accidentally obtain user location information without user consent. In contrast, some implementations described herein may ensure that messages, sent by services, are authorized to send messages to users (e.g., ensure that the users have provided consent for such messages).

Figure 3:
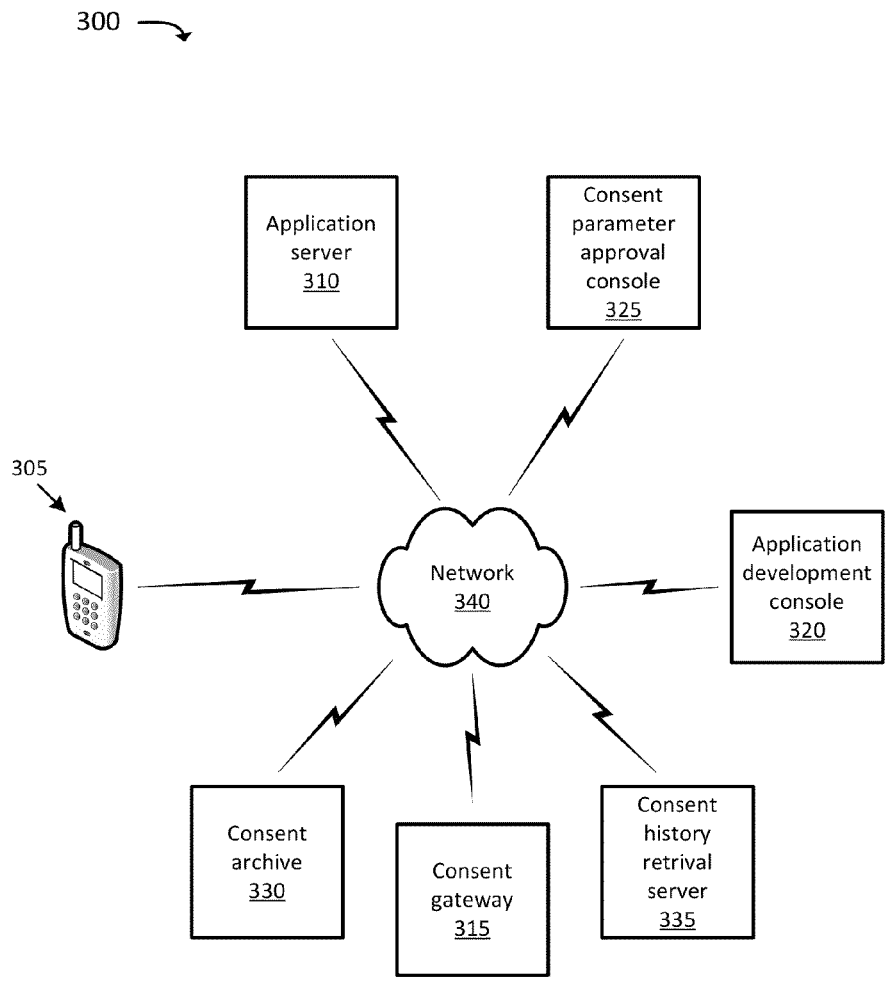
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include user device 305, application server 310, consent gateway 315, application development console 320, consent parameter approval console 325, and network 340. The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections, which may or may not traverse or be dependent upon the Internet or other public or private network or infrastructure or point of presence.

User device 305 may include any computation and communication device, such as a wireless mobile communication device that is capable of communicating with network 340. For example, user device 305 may include a radiotelephone; a personal communications system ("PCS") terminal (e.g., a device that combines a wireless radiotelephone with data processing and data communications capabilities); a personal digital assistant ("PDA") (e.g., that can include a radiotelephone, a pager, Internet/intranet access, etc.); a smart phone; a laptop computer; a tablet computer; a wearable computer; a camera; a personal gaming system, or another type of mobile computation and communication device. User device 305 may send and/or receive traffic to and/or from application server 310 via consent gateway 315, network 340, and/or one or more other devices.

Application server 310 may include one or more computation and communication devices that provide one or more services to, for example, user device 305. Application server 310 may also receive information, regarding user device 305, from user device 305, network 340 and/or another source. The service(s) provided by application server 310 may include, for instance, a service whereby user device 305 receives messages (e.g., short message service ("SMS") messages, multimedia service ("MMS") messages, e-mails, tweets, and/or another type of message) sent by, or on behalf of, application server 310.

Consent gateway 315 may include one or more computation and communication devices that perform functions relating to obtaining and/or enforcing user consent for services provided by application server 310. As described below, consent gateway 315 may store information identifying application server 310. The identifying information may include, for example, a mobile directory number ("MDN") associated with application server 310, a "short code" (e.g., a telephone number that includes fewer digits than a "full" telephone number, such as four digits, three digits, etc.), an Internet protocol ("IP") address, or another alphanumeric identifier. Consent gateway 315 may receive messages from user device 305, which are destined for application server 310 (e.g., one or more network devices in network 340 may forward such messages to consent gateway 315). Additionally, or alternatively, consent gateway 315 may receive messages from application server 310, which are destined for user device 305 (e.g., one or more network devices in network 340 may forward such messages to consent gateway 315). Consent gateway 315 may, in some implementations, enforce the consent provided or denied by a user of user device 305, by monitoring messages sent by application server 310, and causing the messages to not be forwarded to user device 305 when application server 310 is not authorized (e.g., does not have consent) to send the messages to user device 305.

Consent gateway 315 may be associated with an application programming interface ("API"), which may allow for the defining and implementation of custom consent parameters (such as custom consent messages, custom consent options, and actions to take upon selection of the options). In some implementations, consent gateway 315 may be implemented by, or on behalf of, a provider of network 340. The provider of network 340 may, in some implementations, require that application server 310 use the API, associated with consent gateway 315, when transmitting consent messages to user devices 305 associated with network 340.

Application development console 320 may include one or more computation and communication devices, via which a user (e.g., a developer associated with an application that uses consent messages) may generate an application (e.g., may develop programming code that defines the application). When generating the application, the user may define custom consent parameters associated with the application (such as custom consent messages, custom consent options, and actions to take upon selection of the options). For instance, the user may define the custom consent parameters according to the API associated with consent gateway 315. Application development console 320 may output the application to application server 310, and/or may output the custom consent parameters to application server 310, consent gateway 315, and/or to consent parameter approval console 325.

Consent parameter approval console 325 may include one or more computation and communication devices, via which a user (e.g., an administrator associated with consent gateway 315 and/or network 340) may review, approve, and/or disapprove custom consent parameters (e.g., parameters defined at application development console 320). For example, the user may disapprove a custom consent message that is too lengthy or offensive. Consent parameter approval console 325 may, in some implementations, notify application development console 320 of custom consent parameters that were disapproved, and may output approved custom consent parameters to application server 310 and/or to consent gateway 315.

Consent archive 330 may include one or more computation and communication devices, which may receive information regarding consent provided by users. In some implementations, when consent gateway 315 determines that consent for an application has been granted or denied, consent gateway 315 may provide an indication to consent archive 330 regarding the consent or denial. Consent archive 330 may store history information regarding consent that has been granted or denied by users for a particular period of time (e.g., one year, seven years, ten years, or any other period of time that may be configured by an administrator associated with consent archive 330). The consent history information may include, in some implementations, information regarding specific consent messages that have been sent to users (e.g., applications and/or application providers associated with consent messages, brands and/or advertising that has been presented to users via consent messages, etc.). In some implementations, a user may be provided with an option to view and/or remove history information associated with the user.

Consent history retrieval server 335 may include one or more computation and communication devices, which may allow for retrieval of information stored by consent archive 330. For example, consent history retrieval server 335 may provide a user interface, via which users (e.g., a network provider, a service provider, an application provider, a legal department, a customer service department, a marketing department, a product manager, and/or another user) may access information stored in consent archive 330. In some implementations, consent history retrieval server 335 may authenticate users that are attempting to access consent archive 330 (e.g., via username and password, and/or via other authentication techniques).

Network 340 may include one or more wired and/or wireless networks. For example, network 340 may include a packet data network ("PDN"), such as an IP-based PDN. Network 340 may include, for example, a wide area network such as the Internet, a public or private wireless network (sometimes referred to as a "WiFi" network), and/or one or more other networks. Devices 305-335 and/or other devices may communicate with each other via network 340, and/or via one or more other networks.

In some implementations, network 340 may include an evolved packet system ("EPS") that includes a LTE network and/or an evolved packet core ("EPC") network that operate based on a third generation partnership project ("3GPP") wireless communication standard. The LTE network may be, or may include, a radio access network ("RAN") that includes one or more base stations, some or all of which may take the form of an evolved node B ("eNB"), via which user device 305 may communicate with the EPC network. The EPC network may include one or more serving gateways ("SGWs"), mobility management entities ("MMEs"), and/or packet data network gateways ("PGWs"), and may enable user device 305 to communicate with network 340 and/or an IP multimedia subsystem ("IMS") core network. The IMS core network may include home a subscriber server/authentication, authorization, and accounting server ("HSS/AAA server"), and may manage authentication, session initiation, account information, a user profile, etc. associated with user device 305.

Figure 4:
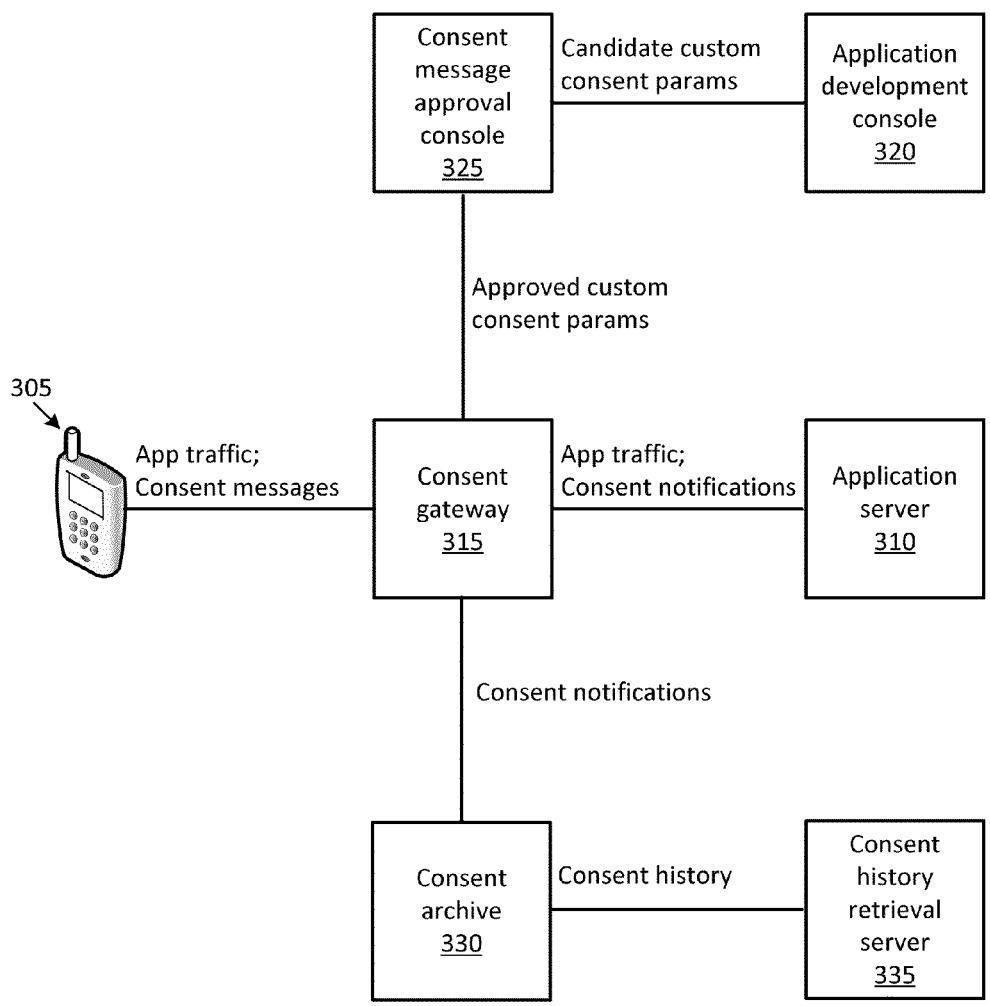
FIG. 4 conceptually illustrates how various devices, shown in FIG. 3, may communicate, according to one or more implementations.

FIG. 4 conceptually illustrates how various devices, shown in FIG. 3, may communicate. Network 340 is not shown in this conceptual figure; however, in some implementations, one or more of the connections shown in FIG. 4 may occur via network 340 and/or another network. In this sense, FIG. 4 may be considered to be a functional diagram of various components of environment 300, according to some implementations.

As shown, application development console 320 may output candidate custom consent parameters to consent parameter approval console 325. As discussed above, application development console 320 may receive these custom consent parameters from, for example, a user, such as a developer of an application. Consent parameter approval console 325 may output approved custom consent parameters to consent gateway 315 (e.g., custom consent parameters that have been approved by an administrator).

As described below, consent gateway 315 may use these custom consent parameters to obtain consent, from user device 305, for a service provided by application server 310. For example, consent gateway 315 may output consent messages (e.g., custom consent messages defined by the custom consent parameters) to user device 305, and may receive a response from user device 305 indicating whether user device 305 has consented to the service. Consent gateway 315 may, in some implementations, output consent notifications to application server 310 (e.g., notifications of whether application server 310 has been granted consent by user device 305).

Consent gateway 315 may also receive application traffic from application server 310, and determine, based on an indication of consent received from user device 305, how to process the traffic. This application traffic may include, for example, messages to be sent to user device 305, requests to other devices for information regarding user device 305 (e.g., a request for an identity of a user associated with user device 305, a request for information regarding the physical location of user device 305, etc.), or other traffic.

Consent gateway 315 may, in some implementations, output information regarding consent that was received or denied to consent archive 330. As mentioned above, consent history retrieval server 335 may serve as an interface to access information stored in consent archive 330. Based on authenticated requests, consent archive 330 may output some or all of the information, stored in consent archive 330, to a requesting device via consent history retrieval server 335.

FIG. 5 is an example data structure 500, which may be stored by consent gateway 315, and/or by another device. Data structure 500 may store information regarding custom consent parameters, which may be used by consent gateway 315 when determining whether a particular user device 305 has granted or denied consent for a particular application or service. A particular example arrangement of rows and columns is shown in FIG. 5. However, in practice, a different arrangement may be used, and/or additional, fewer, or different information may be stored in data structure 500.

As shown, data structure 500 may include information identifying applications ("application ID"), custom consent messages, and consent options and actions. As mentioned above, in some implementations, data structure 500 may include additional or different information. For example, in some implementations, data structure 500 may include information regarding companies or brands associated with applications and/or other parties.

The application ID may include information identifying an application and/or a particular application server 310. The application ID may include a MDN, a "short code," an IP address, and/or another type of identifier associated with a particular application or application server 310.

The information regarding custom consent messages may include text of consent messages to be sent to user device 305 when consent gateway 315 detects that consent should be obtained from user device 305. In some scenarios, the custom consent messages may be different consent messages than are normally provided by consent gateway 315 (e.g., default messages that are defined by consent gateway 315). As shown, some applications may be associated with a default consent message. Such a situation may occur when a custom consent message, submitted by a developer, is not approved, when the developer has not specified a custom consent message, and/or when the developer has specified that the default consent message should be used.

The information regarding the consent options and actions may define responses, to the custom consent message, which may be received from user device 305, and actions to take based on these responses. For example, referring to row 505, the consent options may include "Y," "N," "All others," and "No answer for 15 minutes." These options may refer to, for example, possible text in SMS messages received from user device 305 after the custom consent message is sent to user device 305 (e.g., if the SMS message includes the letter "Y," or if the entirety of the SMS message is the letter "Y," etc., then consent gateway 315 may determine that the "Y" option has been selected by user device 305).

As further illustrated, data structure 500 may also include information regarding actions to take based on determining that a particular consent option has been selected. For example, referring to row 505, the selection of the option "Y" may indicate that a one-time location request for user device 305 has been approved, and that the selection of the option "N" may indicate that a one-time location request for user device 305 has not been approved. Based on these options, consent gateway 315 may determine whether to approve a subsequent request, by application server 310, for a request for information identifying the location of user device 305.

Row 505 further illustrates that for all other options (e.g., if user device 305 responds with a message other than the letters "Y" or "N"), the consent message should be re-sent once. This may allow for a situation in which a user has accidentally replied ambiguously (e.g., unintentionally sent a SMS message with the letter "M" instead of "N"). If another ambiguous message is received, then consent gateway 315 may determine that consent has not been granted by user device 305. Still further, row 505 illustrates that if a response has not been received for 15 minutes, then consent gateway 315 should determine that the consent request has been denied.

As shown in row 510, consent options may be dynamic, in that actions taken may vary based on consent options selected by user device 305. For example, row 510 illustrates a consent option of "non-zero integer," with an option to allow traffic associated with the service for a quantity of hours specified by the non-zero integer.

As shown in row 515, an application may be associated with a set of default consent options and actions. These default options and actions may be, for example, default options and actions specified by consent gateway 315.

Figure 6:
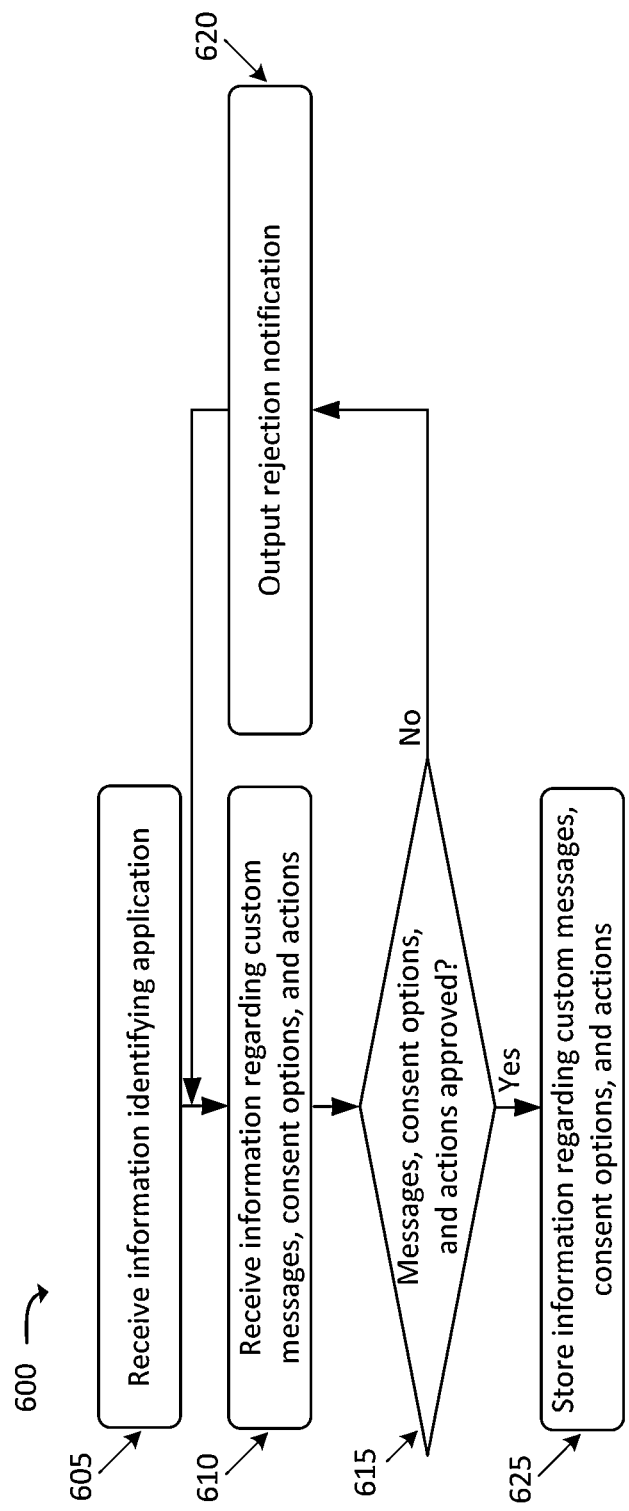
FIG. 6 illustrates an example process for storing information regarding custom consent messages, options, and actions.

FIG. 6 illustrates an example process 600 for storing information regarding custom consent messages, options, and actions. In one example implementation, process 600 may be performed by consent gateway 315. In other implementations, some or all of process 600 may be performed by one or more other devices in lieu of, or in conjunction with, consent gateway 315.

Process 600 may include receiving information identifying an application or application server (block 605). For example, consent gateway 315 may receive information regarding a MDN, a short code, and/or another type of identifier of an application or a particular application server 310. Consent gateway 315 may, in some implementations, receive the identifying information from network 340, application server 310, and/or another source. As described below, consent gateway 315 may use this information when identifying traffic to and/or from application server 310.

Process 600 may also include receiving information regarding custom consent messages, options, and actions (block 610). For example, consent gateway 315 may receive information regarding custom consent parameters (e.g., consent messages, options, and actions) from, for instance, application development console 320 and/or from consent parameter approval console 325. Alternatively, in some implementations, consent parameter approval console 325 may receive (at block 610) the custom consent parameters from, for example, application development console 320.

Process 600 may further include determining whether the custom consent messages, options, and actions have been approved (block 615). For instance, consent gateway 315 (or, in some implementations, consent parameter approval console 325) may receive an indication of whether the custom consent parameters have been approved (e.g., by an administrator, via consent parameter approval console 325).

If the consent messages, options, and actions have not been approved (block 615—NO), then process 600 may include outputting a rejection notification (block 620). For example, consent gateway 315 (or, in some implementations, consent parameter approval console 325) may output a notification to, for example, application development console 320, indicating that the custom consent parameters have not been approved. This may occur when, for example, a custom consent message is not associated with proper options/actions (e.g., a consent message that specifies that a user should reply "Y" to grant consent, but the associated option for "Y" indicates that consent has not been granted). Other situations, in which custom consent parameters may not be approved, may occur when a custom consent message is too long, contains profanity, contains misspelled words, contains improper grammar, and/or other instances in which an administrator wishes to forgo approving custom consent parameters.

If, on the other hand, the consent messages, options, and actions have been approved (block 615—YES), then process 600 may include storing information regarding the consent messages, options, and actions (block 625). For example, consent gateway 315 may store the custom consent parameters using, for example, data structure 500 or a similar data structure. Additionally, or alternatively, consent gateway 315 may output the custom consent parameters to application server 310 and/or to another device.

Figure 7:
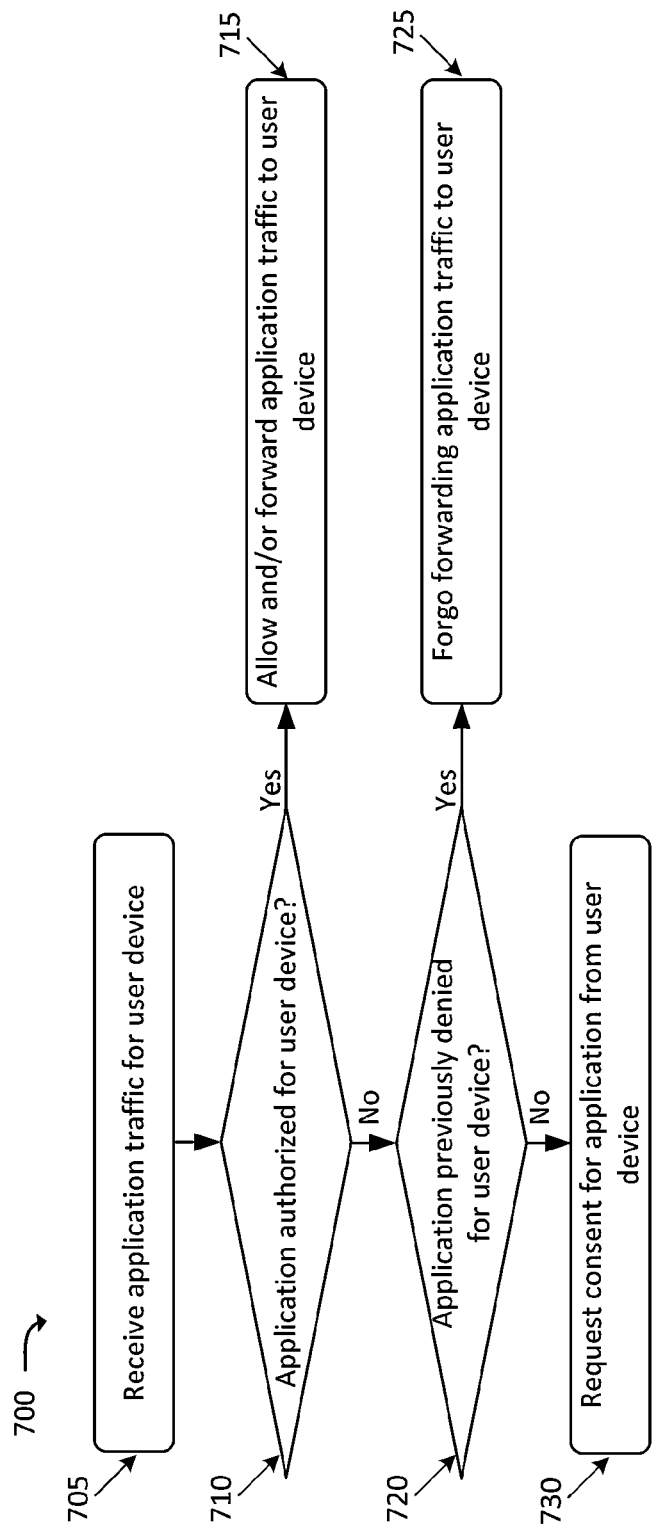
FIG. 7 illustrates an example process for handling application traffic.

FIG. 7 illustrates an example process 700 for handling application traffic. In one example implementation, process 700 may be performed by consent gateway 315. In other implementations, some or all of process 700 may be performed by one or more other devices in lieu of, or in conjunction with, consent gateway 315.

Process 700 may include receiving application traffic for a user device (block 705). For example, consent gateway 315 may receive traffic from application server 310 (e.g., via network 340). The received traffic may be destined for a particular user device 305. For example, the traffic may include a message (such as an SMS message, a MMS message, or another type of message), which includes an MDN and/or another type of identifier that indicates that the intended recipient is user device 305.

Process 700 may also include determining whether the application is authorized for the user device (block 710). For example, consent gateway 315 may determine whether user device 305 has previously granted consent to application server 310. If the application is authorized (block 710—YES), then process 700 may include allowing and/or forwarding the application traffic to the user device (block 715). For example, consent gateway 315 may allowing and/or forward the traffic (received at block 705) to user device 305. In some implementations, consent gateway 315 may output a notification to one or more other devices (e.g., one or more devices in network 340), indicating that the traffic should be allowed and/or forwarded to user device 305.

If, on the other hand, the application is not authorized (block 710—NO), then process 700 may include determining whether the application was previously denied for the user device (block 720). In this scenario, the application traffic may be treated as being associated with an enrollment request—that is, a request to enroll in a service provided by application server 310. Alternatively, the application traffic may be traffic sent by application server 310, to user device 305, after a user has indicated interest in the service provided by application server 310 (e.g., by signing up for the service via a web interface, but not via the same communication technique via which the traffic was received at block 705), but before consent gateway 315 has determined that consent has been granted by user device 305.

If the application has previously been denied for the user device (block 710—NO and block 720—YES), then process 700 may include forgoing allowing and/or forwarding the application traffic to the user device block 725). For example, consent gateway 315 may forgo allowing and/or forwarding the traffic (received at block 705) to user device 305. In some implementations, consent gateway 315 may output a notification to one or more other devices (e.g., one or more devices in network 340), indicating that the traffic should not be allowed and/or forwarded to user device 305.

If, on the other hand, the application has not been previously denied for the user device (block 710—NO and block 720—NO), then process 700 may include requesting consent for the application from the user device (block 730). An example of requesting consent is described below with respect to process 800, shown in FIG. 8. Based on receiving a grant or denial of the consent (requested at block 730), consent gateway 315 may determine whether to allow and/or forward the application traffic to user device 305 (e.g., as similarly described with respect to block 715) or to forgo allowing and/or forwarding the application traffic to user device 305 (e.g., as similarly described with respect to block 725).

While process 700 is described in the context of traffic, sent by application server 310 and to user device 305, process 700 may also be similarly applied to requests made by application server 310 to devices other than user device 305. For example, consent gateway 315 may receive (at block 705) a request for information regarding a geographical location of user device 305. Consent gateway 315 may determine (at block 710) that the application is authorized for the user device. Based on determining that the application is authorized for the user device (block 710—YES), consent gateway 315 may forward the request to network 340 (and/or to another device), and/or may indicate to network 340 that the application is authorized to receive location information for user device 305. As another example, assume that consent gateway 315 determines that the application has been previously denied for the user device (block 710—NO and block 720—YES). In this situation, consent gateway 315 may forgo forwarding the request for the location of user device 305 to network 340, and/or may otherwise forgo providing information regarding the location, of user device 305, to application server 310.

Figure 8:
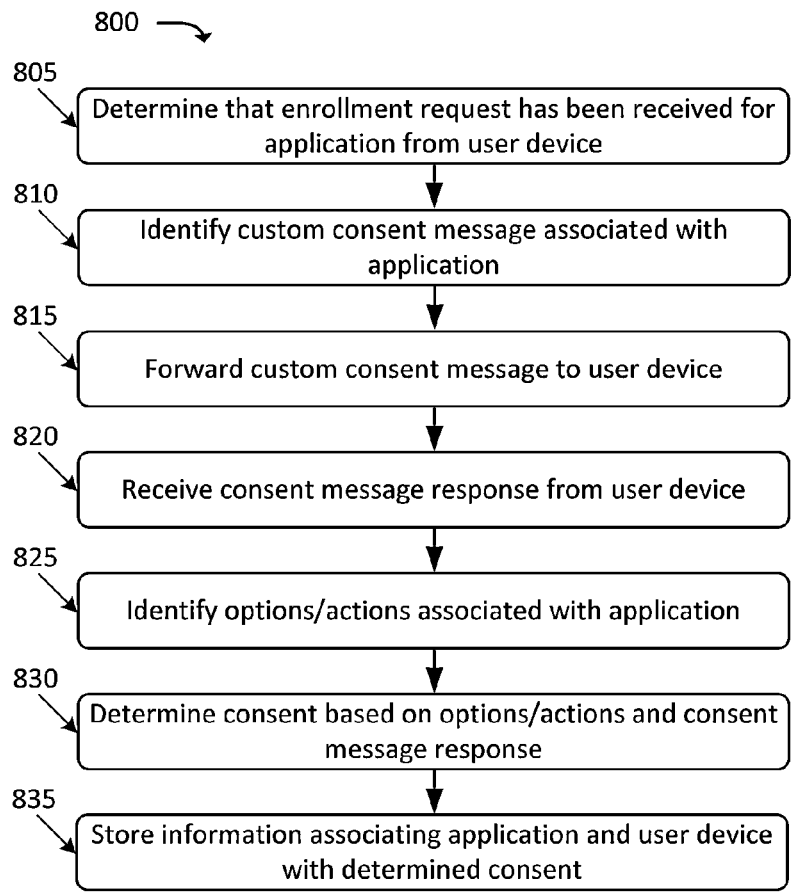
FIG. 8 illustrates an example process for handling an enrollment and/or consent request.

FIG. 8 illustrates an example process 800 for handling an enrollment request. As mentioned above, some or all of process 800 may correspond to block 730 of process 700. In one example implementation, process 800 may be performed by consent gateway 315. In other implementations, some or all of process 800 may be performed by one or more other devices in lieu of, or in conjunction with, consent gateway 315.

Process 800 may include determining that an enrollment request has been received for an application from a user device (block 805). For example, consent gateway 315 may receive traffic from a particular application server 310, destined for a particular user device 305, and may determine that user device 305 has not previously granted consent for application server 310 to send traffic to user device 305. In some implementations, consent gateway 315 may receive a notification from user device 305 and/or from another device that user device 305 has enrolled in a service provided by application server 310. For instance, a user associated with user device 305 may have signed up, via a web browser interface, to receive text message alerts from application server 310. Application server 310 (or another device) may, in this situation, notify consent gateway 315 that user device 305 has enrolled in the service offered by application server 310. Based on the enrollment request (received at block 805), consent gateway 315 may determine that consent is required, from user device 305, before application server 310 is authorized to send application traffic to user device 305. In some implementations, the enrollment request may include identifying information for application server 310 (e.g., an MDN, a short code, and/or another identifier).

Process 800 may also include identifying a custom consent message associated with the application (block 810). For example, consent gateway 315 may identify the custom consent message based on information stored in data structure 500, or a similar data structure.

Process 800 may further include forwarding the custom consent message to the user device (block 815). For example, consent gateway 315 may forward (or cause to be forwarded) the custom consent message (identified at block 810) to user device 305. As mentioned above, the custom consent message may be forwarded to user device 305 via a SMS message, a MMS message, an e-mail message, and/or another type of message.

Process 800 may additionally include receiving a response to the consent message from the user device (block 820). For instance, consent gateway 315 may receive a message from user device 305, and/or may receive an indication that a message has been received from user device 305. This message may be destined for application server 310 (e.g., may include an MDN, a short code, and/or another identifier associated with application server 310), and thusly "intercepted" by consent gateway 315. That is, while the response message may indicate that the intended recipient is application server 310, one or more devices of network 340 (and/or another device) may forward the message to consent gateway 315.

Process 800 may also include identifying options and actions associated with the application (block 825). For example, consent gateway 315 may identify options and actions, associated with the application, stored in data structure 500.

Process 800 may further include determining the consent (e.g., the level of consent) associated with the application and the user device based on the options and actions associated with the application, and also based on the consent message response (block 830). For example, referring to the example information shown row 505 of data structure 500 in FIG. 5, assume that the response message (received at block 820) includes the letter "Y." In this scenario, consent gateway 315 may determine that the consent level is an approval for a one-time location request. As another example, and again referring to the example information shown row 505 of data structure 500 in FIG. 5, assume that the response message (received at block 820) includes the letter "N." In this scenario, consent gateway 315 may determine that the consent level is a denial.

Process 800 may additionally include storing information associating the application and the user device with the determined level of consent (block 835). For example, consent gateway 315 may store or output information indicating the level of consent (determined at block 830) that has been granted to application server 310, by user device 305. Consent gateway 315 may use this stored information when receiving application traffic from application server 310 for user device 305 (e.g., when determining whether an application is authorized for a user device, at block 710 of process 700).

Figure 9:
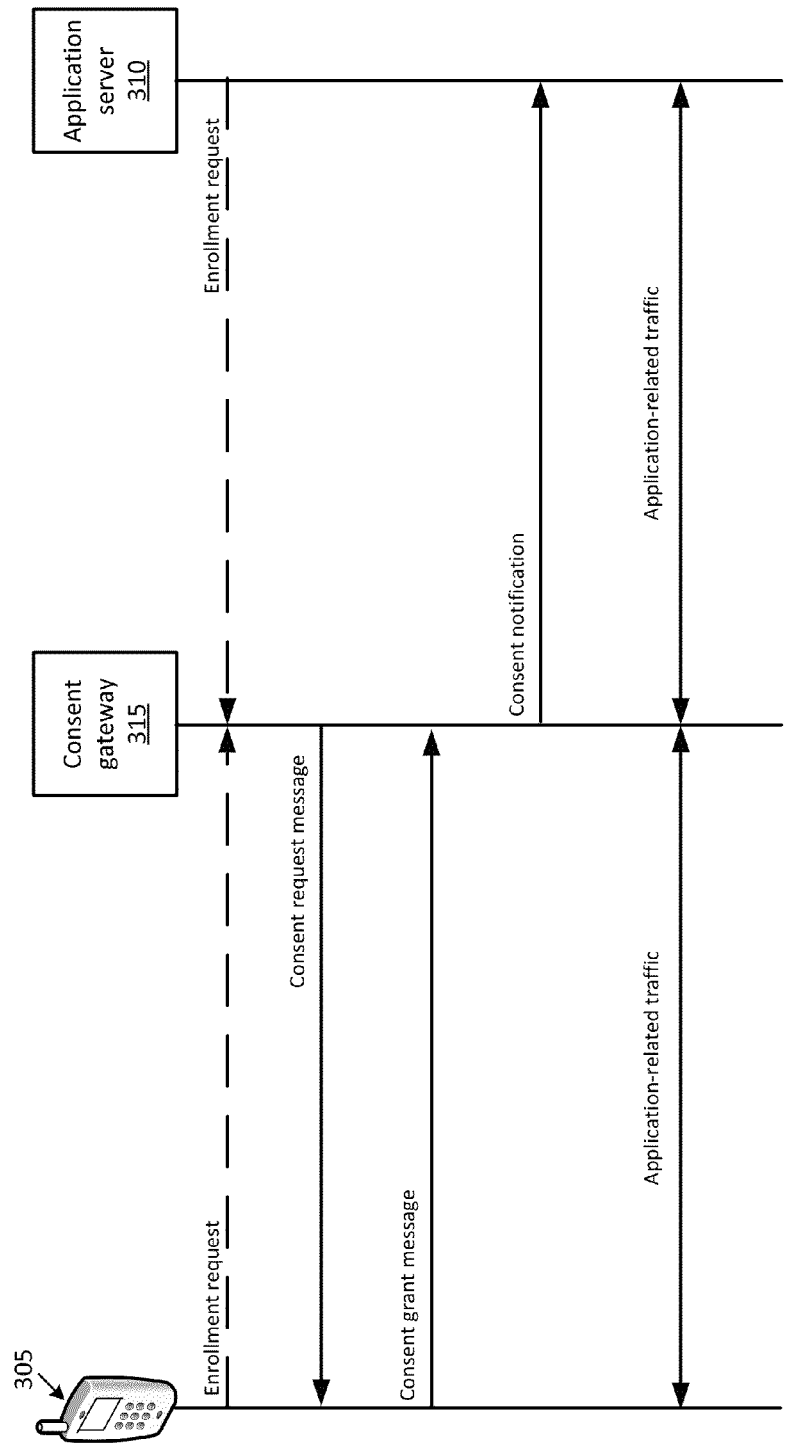
FIGS. 9 and 10 conceptually illustrate techniques for obtaining consent for applications.
Figure 10:
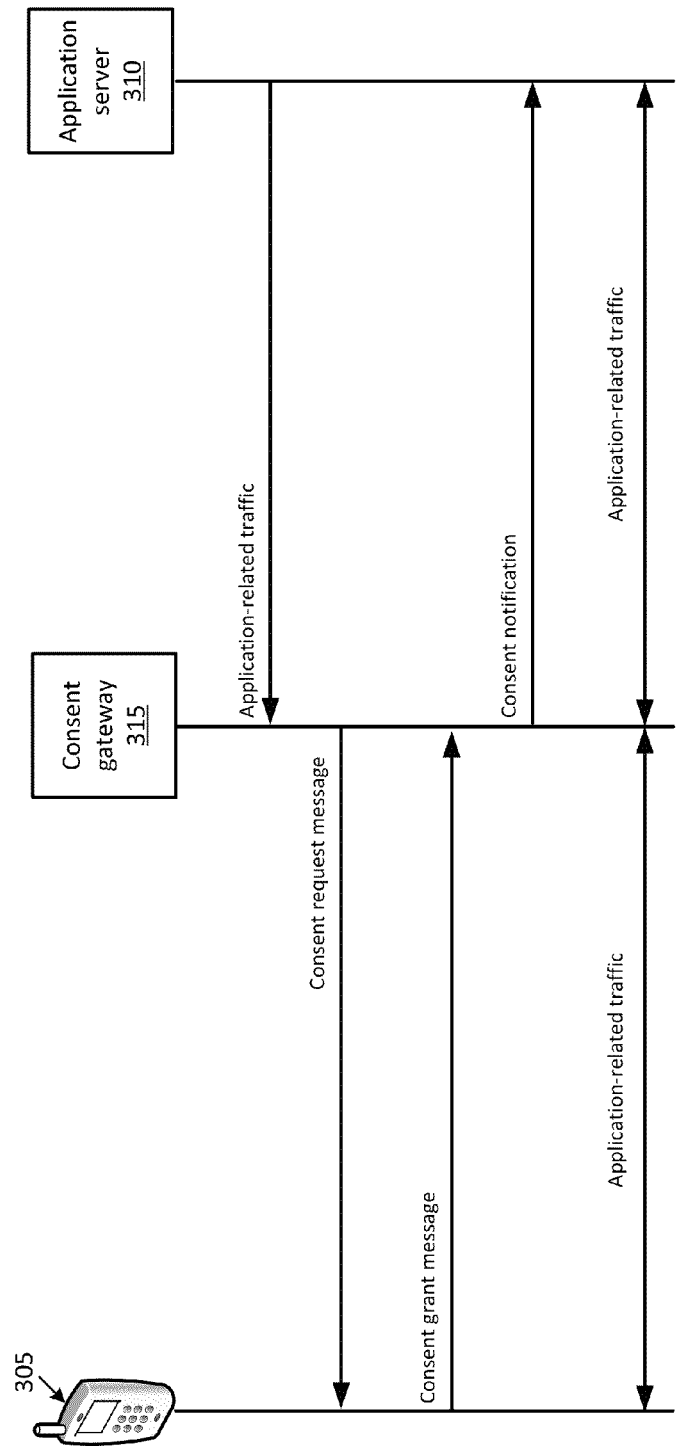

FIGS. 9 and 10 conceptually illustrate techniques for obtaining consent for applications. For instance, FIG. 9 illustrates an example signal flow in implementations where consent gateway 315 obtains consent from user device 305 based on receiving an enrollment request. As shown in FIG. 9, consent gateway 315 may receive an enrollment request. As indicated by the dashed lines, this enrollment request may be received from user device 305, or from application server 310. Additionally, or alternatively, consent gateway 315 may receive the enrollment request from one or more other devices. This enrollment request may indicate that a user, associated with user device 305, is potentially interested in a service offered by application server 310. However, the user has not yet explicitly granted consent to application server 310 to send messages to user device 305, and/or to request information associated with user device 305.

Based on receiving the enrollment request, consent gateway 315 may output a consent request message to user device 305. This consent request message may, in some implementations, be a custom consent message (e.g., a custom consent message defined by a developer or another user associated with application server 310).

As further shown in FIG. 9, user device 305 may output a consent grant message to consent gateway 315, indicating that user device 305 has granted consent to application server 310 (e.g., consent for application server 310 to output traffic to user device 305, and/or consent for application server 310 to access information associated with user device 305). In some implementations, this consent grant message may indicate an extent of consent granted as well (e.g., duration of time, a quantity of messages that may be sent by application server 310 to user device 305, an amount of data that may be sent by application server 310 to user device 305, an amount and/or type of information that may be requested by application server 310, etc.).

Based on receiving the consent grant message, consent gateway 315 may output a notification to application server 310, indicating that consent has been granted to application server 310 by user device 305. Based on this consent notification, application server 310 may become aware that user device 305 has granted consent to application server 310. Application server 310 may begin to output application traffic to user device 305 (and/or may make requests for information, regarding user device 305, from one or more other devices). Furthermore, based on identifying that user device 305 has granted consent to application server 310, consent gateway 315 may forward application-related traffic (such as information outputted by user device 305, which may be provided based on requests from application server 310) from user device 305 to application server 310.

FIG. 10 illustrates an example signal flow in implementations where consent gateway 315 obtains consent from user device 305 based on receiving application traffic from application server 310. For instance, consent gateway 315 may obtain consent when receiving application traffic, and determining that user device 305 has not previously granted or denied consent to application server 310. In some such implementations, consent gateway 315 and/or application server 310 may have previously received an enrollment request, indicating that a user of user device 305 may potentially desire to enroll in a service offered by application server 310. This enrollment request may be received from user device 305, and/or from another device (e.g., from a desktop computer, via which the user may have initiated an enrollment request via a web browser interface). In other implementations, the signal flow shown in FIG. 10 may occur without application server 310 or consent gateway 315 having received such an enrollment request.

As shown in FIG. 10, consent gateway 315 may receive application-related traffic from application server 310 (e.g., a message destined for user device 305, a request for information regarding user device 305, etc.). As mentioned above, consent gateway 315 may determine that user device 305 has not previously granted or denied consent to application server 310.

Based on determining that user device 305 has not previously granted or denied consent to application server 310, consent gateway 315 may output a consent request message to user device 305. This consent request message may, in some implementations, be a custom consent message (e.g., a custom consent message defined by a developer associated with application server 310).

As further shown in FIG. 10, user device 305 may output a consent grant message to consent gateway 315, indicating that user device 305 has granted consent to application server 310 (e.g., consent for application server 310 to output traffic to user device 305, and/or consent for application server 310 to access information associated with user device 305). In some implementations, this consent grant message may indicate an extent of consent granted as well (e.g., duration of time, a quantity of messages that may be sent by application server 310 to user device 305, an amount of data that may be sent by application server 310 to user device 305, an amount and/or type of information that may be requested by application server 310, etc.).

Based on receiving the consent grant message, consent gateway 315 may output a notification to application server 310, indicating that consent has been granted to application server 310 by user device 305. Based on this consent notification, application server 310 may become aware that user device 305 has granted consent to application server 310. Application server 310 may begin to output application traffic to user device 305 (and/or may make requests for information, regarding user device 305, from one or more other devices). Furthermore, based on identifying that user device 305 has granted consent to application server 310, consent gateway 315 may forward application-related traffic (such as information outputted by user device 305, which may be provided based on requests from application server 310) from user device 305 to application server 310.

Figure 11:
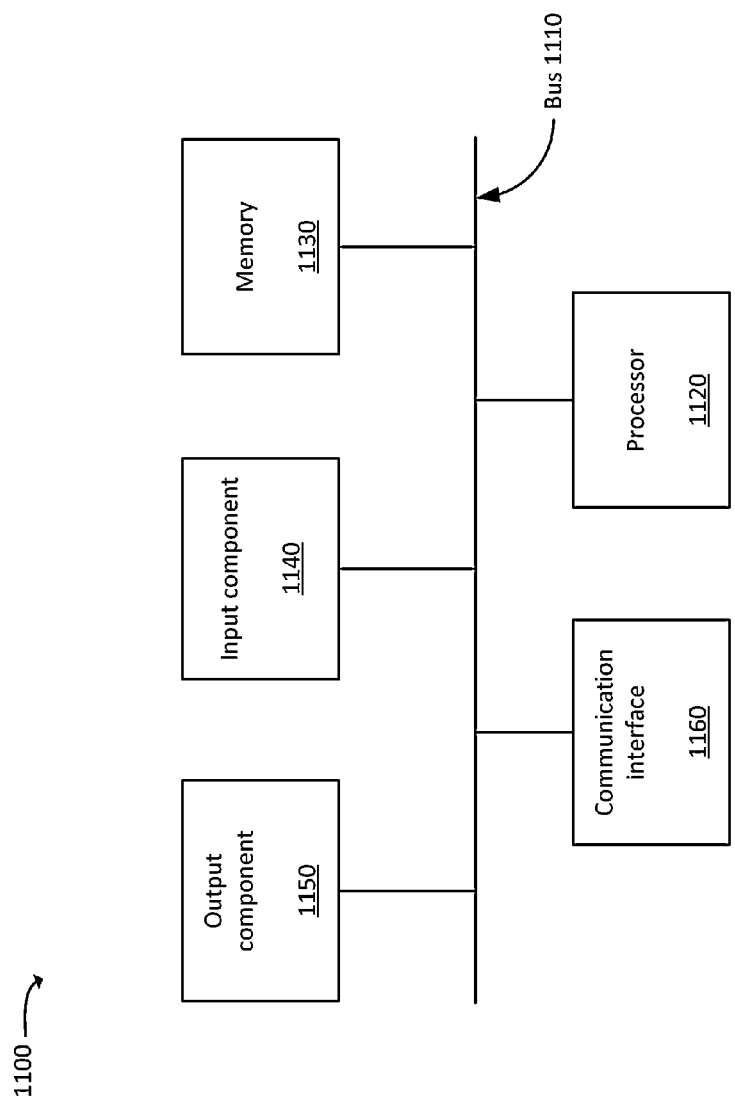
FIG. 11 illustrates example components of one or more devices shown in FIGS. 1-4.

FIG. 11 is a diagram of example components of device 1100. One or more of the devices illustrated in FIGS. 1-4 may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, a microphone, a camera, a sensor (e.g., a motion sensor), a biometric device, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth radio, an LTE radio, a WiFi radio (e.g., an 802.11x radio), or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6-8, the order of the blocks may be modified in other implementations. Further, non-dependent blocks may be performed in parallel. As another example, while example signal flows have been described with regard to FIGS. 9 and 10, the order of the signals may be modified in some implementations, certain signals may be sent in parallel, and/or additional signals may be sent to and/or from one or more of the described devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
   requesting, by a consent gateway device and from a user device, consent for a particular application server to output one or more messages, associated with a service provided by the particular application server, to the user device, wherein requesting the consent includes:
      outputting a consent message associated with the particular application server;
   receiving, by the consent gateway device, an indication of consent, the indication of consent indicating whether a user of the user device has granted consent to receive application traffic, associated with the service, from the particular application server; and
   enforcing, by the consent gateway device, the consent indicated by the user device, the enforcing including:

receiving application traffic, associated with the service, from the particular application server;

allowing or disallowing the application traffic, from the particular application server, based on the indication of consent, the application traffic being associated with the user device, the allowing or disallowing including:

forwarding, when the indication of consent indicates a grant of consent to receive application traffic from the particular application server, the received application traffic to the user device; and forgoing forwarding, when the indication of consent does not indicate a grant of consent to receive application traffic from the particular application server, the received application traffic to the user device, wherein forgoing forwarding application traffic from the particular application server includes:

forgoing forwarding a request for information, associated with the user device, to one or more other devices.

2. The method of claim 1, wherein forwarding application traffic from the particular application server further includes:
forwarding a request for information, associated with the user device, to one or more other devices.

3. The method of claim 1, wherein forgoing forwarding application traffic from the particular application server further includes outputting a notification to the particular application server, the notification indicating that the application traffic was disallowed.

4. The method of claim 1, wherein the consent message, associated with the particular application server, includes a set of consent options that have been defined by a user of the particular application server.

5. A method, comprising:
requesting, by a consent gateway device and from a user device, consent for a particular application server to output one or more messages, associated with a service provided by the particular application server, to the user device, wherein requesting the consent includes:
outputting a consent message associated with the particular application server;
receiving, by the consent gateway device, an indication of consent, the indication of consent indicating whether a user of the user device has granted consent to receive application traffic, associated with the service, from the particular application server,
wherein the consent gateway device is associated with an application programming interface ("API"), provided by an entity associated with the consent gateway device, that defines a default consent message,
wherein the consent message, associated with the particular application server, is different from the default consent message defined by the API; and
enforcing, by the consent gateway device, the consent indicated by the user device, the enforcing including:
receiving application traffic, associated with the service, from the particular application server;
allowing or disallowing the application traffic, from the particular application server, based on the indication of consent, the application traffic being associated with the user device, the allowing or disallowing including:
forwarding, when the indication of consent indicates a grant of consent to receive application traffic from the particular application server, the received application traffic to the user device; and
forgoing forwarding, when the indication of consent does not indicate a grant of consent to receive application traffic from the particular application server, the received application traffic to the user device.

6. The method of claim 5, wherein forgoing forwarding application traffic from the particular application server includes outputting a notification to the particular application server, the notification indicating that the application traffic was disallowed.

7. The method of claim 5, wherein the consent message, associated with the particular application server, includes a set of consent options that have been defined by a user of the particular application server.

8. A method, comprising:
identifying, by a consent gateway device, a set of custom consent parameters associated with an application server device that provides a message-based service, the set of custom consent parameters including:
a consent message,
a set of consent options including:
a first consent option relating to indefinitely allowing application traffic, related to the message-based service, from the application server device to the user device,
a second consent option relating to allowing application traffic from the application server device, related to the message-based service, to the user device for a particular duration of time, or
a third consent option relating to disallowing application traffic, related to the message-based service, from the application server device to the user device, and
a set of actions that are each associated with a particular consent option, of the set of consent options;
receiving, by the consent gateway device and from the application server device, application traffic, related to the message-based service, that is destined for a user device;
determining, by the consent gateway device and based on receiving the application traffic from the application server device, that consent, for traffic from the application server device, has not been received from the user device;
outputting, from the consent gateway device and to the user device, and based on determining that consent has not been received from the user device, the consent message;
receiving, by the consent gateway device and from the user device, a response to the consent message;
identifying, by the consent gateway device and based on the response, a particular consent option, of the set of consent options, indicated by the response to the consent message;
identifying, by the consent gateway device, the particular action that is associated with the particular consent option, the particular action including allowing or disallowing the application traffic to be forwarded to the user device; and
performing, by the consent gateway device, the particular action on the application traffic received from the application server device.

9. The method of claim 8, wherein the response to the consent message indicates that the third consent option has been selected, wherein performing the particular action on the traffic includes forgoing forwarding the application traffic, received from the application server device, to the user device.

10. The method of claim 8, wherein the response to the consent message indicates that the first consent option has been selected,
wherein performing the particular action on the traffic includes forwarding the application traffic, received from the application server device, to the user device.

11. The method of claim 8, wherein the response to the consent message indicates that the first consent option has been selected,
wherein performing the particular action on the application traffic includes forwarding a request for information, associated with the user device, to the user device or to one or more other devices, and
allowing the requested information to be forwarded to the application server device.

12. The method of claim 10, wherein the response to the consent message indicates that the second consent option has been selected,
wherein performing the particular action on the traffic includes determining that the limited duration of time has not expired,
wherein the traffic is forwarded based on determining that the limited duration of time has not expired.

13. A device, comprising:
a memory device to store processor-executable instructions; and
one or more processors to execute the processor-executable instructions, wherein executing the processor-executable instructions, the one or more processors are to:
output, to a user device, a consent message to obtain consent for an application server to output application traffic, related to a service provided by the application server, to the user device;
receive, from the user device, an indication of consent, the indication being sent by the user device based on the consent message, the indication of consent indicating whether application traffic, from the application server and destined for the user device, should be allowed or disallowed to be forwarded to the user device,
wherein the consent gateway is associated with an application programming interface ("API") that defines a default consent message,
wherein the consent message, associated with the application server, is different from the default consent message defined by the API; and
enforce, by the consent gateway device, the consent indicated by the user device, wherein when enforcing the consent, the one or more processors are to:
receive application traffic, related to the service, from the application server;
allow or disallow the forwarding of the received application traffic, from the application server, based on the indication of consent, to the user device.

14. The device of claim 13, wherein when allowing application traffic from the application server, the one or more processors are to:
forward the application traffic from the application server, to the user device, or
forward a request for information, associated with the user device, to one or more other devices.

15. The device of claim 13, wherein when disallowing application traffic from the application server, the one or more processors are to:
forgo forwarding the application traffic from the application server, to the user device, or
forgo forwarding a request for information, associated with the user device, to one or more other devices.

16. The device of claim 15, wherein when disallowing application traffic from the application server, the one or more processors are further to output a notification to the application server, the notification indicating that the application traffic was disallowed.

17. The device of claim 13, wherein the consent message, associated with the application server, has been defined by a user of the application server.

18. The device of claim 13, wherein the consent message is associated with a set of consent options, each consent option being associated with an action,
wherein the indication of consent, received from the user device, indicates a particular consent option, of the set of consent options,
wherein the allowing or disallowing occurs based on the action associated with the particular consent option.

19. The device of claim 18, wherein the set of consent options indicates a grant of consent for a limited duration of time,
wherein when enforcing the consent, the one or more processors are further to:
determine whether the limited duration of time has expired; and
when the limited duration of time has expired, disallow the forwarding of the received application traffic to the user device.

20. The device of claim 18, wherein the set of consent options indicates a grant of consent for a limited duration of time,
wherein when enforcing the consent, the one or more processors are further to:
determine whether the limited duration of time has expired; and
when the limited duration of time has not expired, allow the forwarding of the received application traffic to the user device.

* * * * *